US008116729B2

(12) United States Patent
Chow et al.

(10) Patent No.: US 8,116,729 B2
(45) Date of Patent: Feb. 14, 2012

(54) SYSTEM AND METHOD FOR PEER-TO-PEER TRANSFER OF MULTIMEDIA CONTENT AND RECONCILIATION THEREOF

(75) Inventors: Paulo S. T. Chow, North Bend, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 450 days.

(21) Appl. No.: 12/353,213

(22) Filed: Jan. 13, 2009

(65) Prior Publication Data

US 2010/0178864 A1 Jul. 15, 2010

(51) Int. Cl.
*H04M 11/00* (2006.01)
(52) U.S. Cl. .................... 455/406; 379/114.03
(58) Field of Classification Search .............. 455/406, 455/405, 3.06
See application file for complete search history.

(56) References Cited

U.S. PATENT DOCUMENTS

| | | | |
|---|---|---|---|
| 7,304,966 B2 | 12/2007 | Phan-Anh et al. | |
| 7,620,401 B2 * | 11/2009 | Oh | 455/441 |
| 2005/0135286 A1 | 6/2005 | Nurminen et al. | |
| 2005/0216382 A1 | 9/2005 | Chambers et al. | |
| 2007/0299737 A1 | 12/2007 | Plastina et al. | |
| 2009/0170469 A1 * | 7/2009 | Tuli et al. | 455/406 |

FOREIGN PATENT DOCUMENTS

| | | |
|---|---|---|
| EP | 1746518 A1 | 1/2007 |
| WO | WO-2007096474 A1 | 8/2007 |

OTHER PUBLICATIONS

International Search Report and Written Opinion, International Application No. PCT/US2010/020675, filed on Jan. 11, 2010, Applicant: T-Mobile USA, Inc., Date of Mailing: Aug. 17, 2010, 8 pages.
Bertrand, "The IP Multimedia Subsystem in Next Generation Networks," Network, Multimedia and Security Department (RSM)—GET/ENST Bretagne, May 30, 2007, pp. 1-8.
Chen et al., "Introduction to IP Multimedia Subsystem (IMS), Part 1: SOA Parlay X Web services," IBM, Sep. 12, 2006, 13 pages.
IP Multimedia Subsystem IMS Overview and Applications, 3G Americas, Jul. 2004, 17 pages.
Motorola IP Multimedia Subsystem, Motorola, Inc., Nov. 2005, 10 pages.
Session Border Control Functions in IMS-based Converged Networks, Newport Networks Ltd., 2005, 7 pages.

* cited by examiner

*Primary Examiner* — Tu X Nguyen
(74) *Attorney, Agent, or Firm* — Perkins Coie LLP

(57) ABSTRACT

A system and method to enable a transfer of multimedia content between mobile telecommunication devices while maintaining the multimedia traffic within a wireless local network. Multimedia content may be sent from one of the mobile telecommunication devices and delivered to another one or more of the mobile telecommunication devices. The multimedia transfer is facilitated and monitored by a secure agent located within the local network. The secure agent maintains a record of the multimedia content sessions and transmits such information to a billing component. The billing component utilizes the record of content transfer to assess a fee or other charge on the sending device, the receiving device(s), or both sending and receiving devices. In some embodiments, such a charge may include a credit or other reward that is provided to sending devices or receiving devices for implementing a local transfer of multimedia content.

31 Claims, 5 Drawing Sheets

SYSTEM AND METHOD FOR PEER-TO-PEER TRANSFER OF MULTIMEDIA CONTENT AND RECONCILIATION THEREOF

BACKGROUND

An IP Multimedia Subsystem (IMS) is defined by 3GPP as a mobile network infrastructure that enables convergence of voice, video, data, and mobile network technology over an Internet Protocol (IP) based infrastructure. It fills the gap between cellular and internet technologies by delivering multimedia to mobile users via an IP connection.

FIG. 1 illustrates a common implementation of an IMS infrastructure 100. The IMS infrastructure 100 delivers multimedia services to users of various mobile devices 102 via an IP network 104. In particular, the IMS infrastructure 100 comprises telecommunications carrier systems 106 having application servers 108 that host various multimedia services, a billing component 110 that charges for the use of the multimedia services, and a core IMS system 112 that establishes a transfer of desired multimedia services to the requesting mobile device or devices 102. The mobile devices 102 establish IP communication access with the telecommunications carrier systems 106 via various network access points 114, such as cellular towers of a mobile telecommunication network. The access points 114 are coupled to the telecommunications carrier systems via a public or private network 104.

The telecommunications carrier provides mobile telecommunications service to the mobile devices 102. The mobile devices 102 may be laptops, mobile phones, PDAs, media players, and similar devices that are able to connect to the access points 114 and transmit data using a variety of transmission standards, such as GPRS (General Packet Radio Service), EDGE (Enhanced Data Rates for GSM Evolution), UMTS (Universal Mobile Telecommunications System), and W-CDMA (Wideband Code Division Multiple Access). The network 104 which is used to transfer IP packets from the access points 114 to the telecommunications carrier systems 106, can be owned and operated by the telecommunications carrier or by a third party service provider.

The application servers 108 provide an integrated and standardized network platform to allow the telecommunications carrier to offer a variety of multimedia services to the mobile devices 102. The application servers 108 are not only responsible for hosting and executing the multimedia services, but also provide the interface against the core IMS server using a SIP protocol. A single application server may host multiple services, for example, telephony and messaging services can run on one application server, and a single service may require multiple application servers.

The application servers 108 can take the form of presence servers, list management servers, and/or instant messaging servers:

A presence server provides services to collect, manage, and distribute real-time availability of the mobile devices 102 and a means for communicating among them. It allows users of the mobile devices to both publish their presence information and subscribe to the service in order to receive notification of changes by other users.

A list management server creates and manages network-based group definitions and associated lists of members for defined groups. A list management server can maintain access lists, permissions, and other service-specific properties associated with groups and group members. Use of a list management server permits a user's contact list, such as an email list of a personal address book, to be specified and used in an application independent manner. This allows a users contact list to be used by the mobile device 102 of the user. It is also used to provide buddy lists for instant messaging or other services.

An instant messaging server provides a communication service that allows mobile devices 102 to send and receive messages instantly. Mobile device users are able to deliver messages containing rich text, images, audio, video, or the combination of these over the IP network 104.

The core IMS system 112 is used to establish and control the multimedia session among the mobile devices 102. The core IMS system 112 includes a CSCF (Call Session Control Function) component 116, such as SIP servers or proxies, and a HSS (Home Subscriber Server) component 118. The CSCF 116 establishes, monitors, supports, and releases multimedia sessions and manages the user's interactions with the application servers 108. The CSCF 116 can serve (S-CSCF), proxy (P-CSCF), or interrogate (I-CSCF) multimedia sessions. In functioning as a proxy server (P-CSCF), the CSCF 116 can control the multimedia session. The CSCF 116 handles SIP registration of the mobile devices 102 and processes SIP signal messaging of the appropriate application server to invoke the services requested by a mobile device.

The HSS 118 can be accessed by the CSCF 116 using Diameter or other AAA (Authentication, Accounting, and Authorization) protocols. The HSS 118 is a master database that supports the CSCF 116 in handling the multimedia sessions between mobile devices 102. The HSS 118 stores unique mobile device identities, such as IMPI (IP Multimedia Private ID), IMPU (IP Multimedia Public Identity), as well as hardware identities (e.g., IMEI, MAC, Serial Numbers, etc.) and performs authentication and authorization of the mobile devices. The HSS 118 provides the CSCF 116 with the device identity used to establish multimedia sessions with the mobile devices.

The billing component 110 is connected to the core IMS system 112 via an Open Services Access—Gateway (OSA-GW) or directly through data service components over IP protocols. When the mobile device 102 implements a multimedia session, the billing component 110 is invoked and the user of the mobile device 102 is charged. The charge may be quantified in terms of download quantity (i.e., size of data transfer) or duration (i.e., length of data transfer).

When a multimedia session is to be established as either a download to a mobile device or as shared multimedia between multiple mobile devices 102, it is necessary for the telecommunications carrier to allocate bandwidth for IP transmission of the desired multimedia content. Such allocation of bandwidth limits the available bandwidth of the telecommunications carrier and increases network congestion. Thus, it is desirable to implement a system and method which would free telecommunications carriers from allocating substantial bandwidth towards multimedia content, while maintaining control over multimedia content billing.

DETAILED DESCRIPTION

A system and method to enable a transfer of multimedia content between mobile telecommunication devices while maintaining the multimedia traffic within a wireless local network (e.g., a wireless LAN) is disclosed. The multimedia transfer is facilitated and monitored by a secure agent (a "local IMS server") located within the local network. Multimedia content may be sent from one of the mobile telecommunication devices ("sending device") and delivered to another one or more of the mobile telecommunication devices ("receiving device or devices"). The mobile telecommunication devices may receive telecommunication services from the telecommunications carrier that services the secure agent. Alternatively, at least one of the mobile telecommunication devices may receive services from a third party telecommunications carrier. The local IMS server is configured to allow a multimedia communication session to be established between two or more mobile telecommunications devices and to manage and monitor the transfer of multimedia content between sending and receiving devices. By allowing multimedia content to be transferred via a wireless local network, the local IMS server minimizes the amount of traffic that is handled by a core IMS server and the network of a telecommunications carrier.

The local IMS server maintains a record of the multimedia content sessions and, on a continuous, scheduled, or unscheduled basis, transmits such information to the billing component associated with the core IMS server. The billing component utilizes the record of content transfer to assess a fee or other charge on the sending device, the receiving device(s), or both sending and receiving devices. In some embodiments, such a charge may include a credit or other reward that is provided to sending devices and/or receiving devices for implementing a local transfer of multimedia content. The telecommunication service provider that operates the billing component may also provide session record data to third party carriers that provide service to the applicable receiving devices, to allow the third party carriers to charge for the local multimedia sessions.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 2:
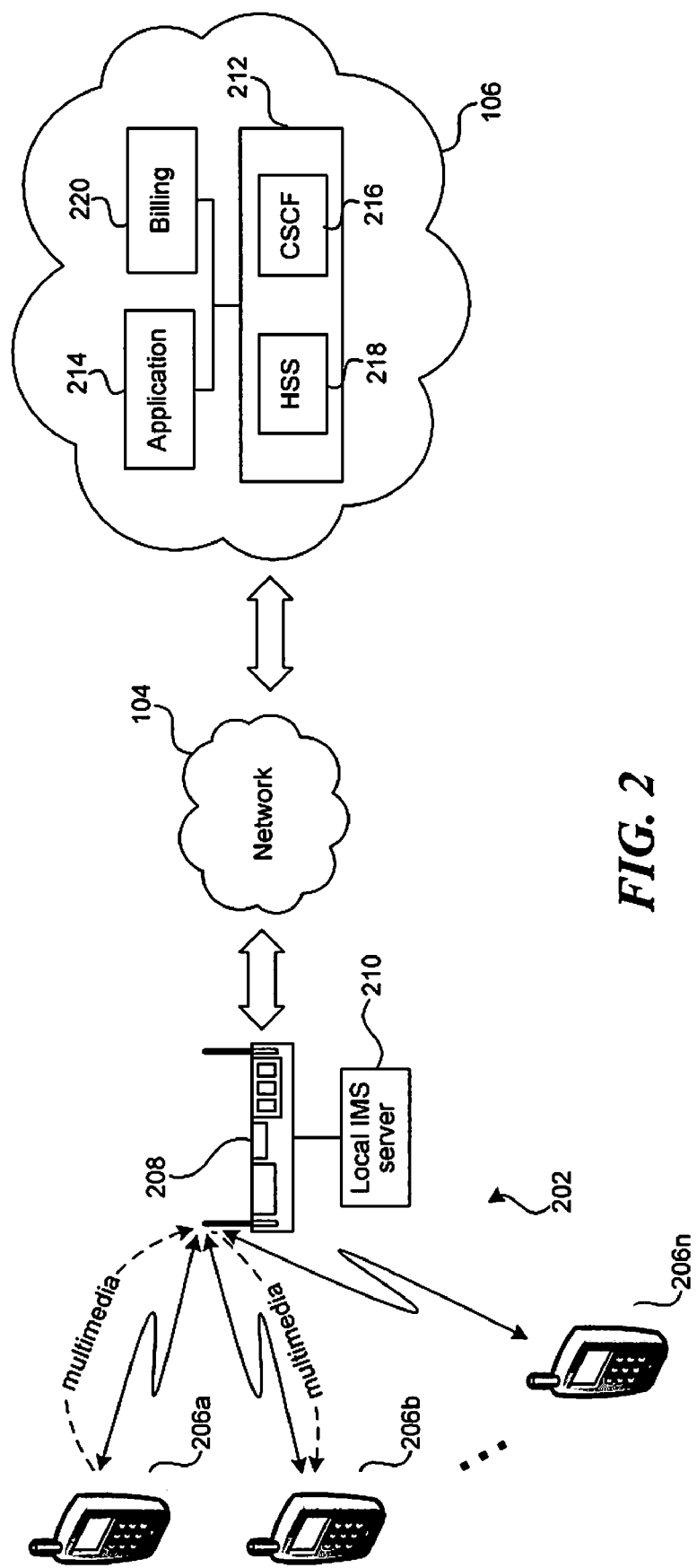
FIG. 2 is a schematic illustration of a network architecture that enables the transfer of multimedia content between mobile telecommunication devices while maintaining multimedia traffic within a local network.

FIG. 2 is a schematic illustration of a network architecture that allows multimedia content to be transferred between mobile telecommunication devices while maintaining multimedia session traffic within a wireless local network 202. The network architecture comprises the wireless local network 202 communicatively coupled to the telecommunications carrier systems 106 through network 104. The network 104 may be serviced and operated by the telecommunications carrier that operates the carrier systems or may be serviced and operated by a third party carrier.

Figure 1:
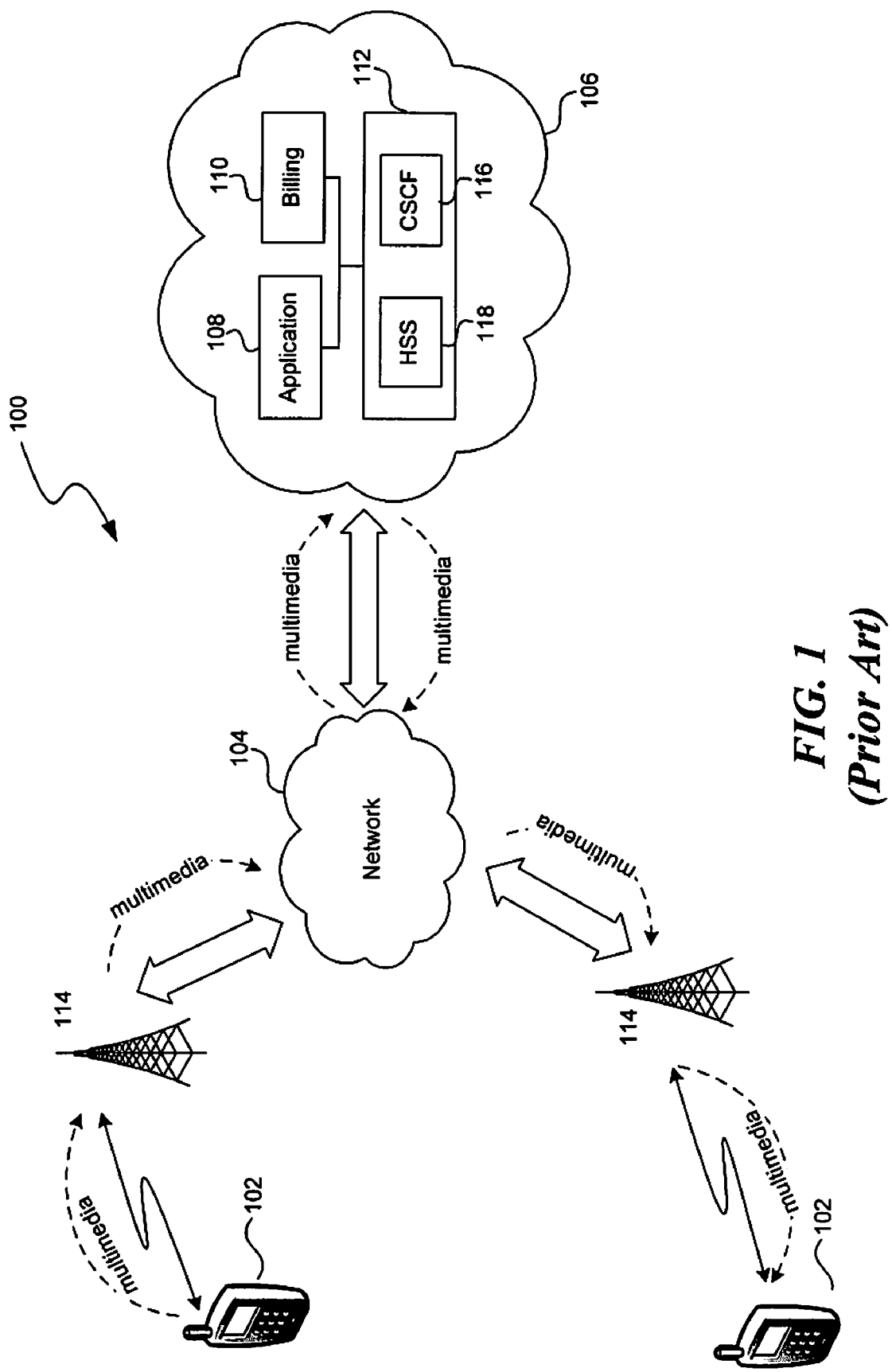
FIG. 1 is a schematic illustration of an IP Multimedia Subsystem architecture used in the art.

The wireless local network 202 comprises a single wireless access point 208 that is coupled to a local IMS server 210. The wireless LAN (Local Area Network) established by the access point 208 may cover a relatively small physical area, such as, e.g., a home, office, coffee shop, a school, an airport, or any small building or group of buildings. The access point 208 may, for example, take the form of a router, switch, or access element that is coupled to the IP network 104 and to the local IMS server 210. The access point 208 receives data wirelessly transmitted from the mobile devices 206 using Wi-Fi, Bluetooth, or related standards. The received data may be conveyed to the local IMS server 210 or to the telecommunications carrier systems 106 via the network 104. The telecommunications carrier systems 106 include many of the same components that were discussed with respect to FIG. 1. Namely, the telecommunications carrier systems 106 include a core IMS server 212 that has a HSS component 218 and a CSCF component 216. The telecommunications carrier systems 106 also include one or more application servers 214 and a billing server 220. The components in the telecommunications carrier systems 106 operate in a similar fashion as described with respect to FIG. 1, except as modified to account for multimedia sessions that are conducted across the wireless local network 202 as described herein.

The local IMS server 210 may be a separate component to the access point 208, or may be integrated within the access point 208. When operating as a separate component, the local IMS server may be implemented on a personal computer or other computing device that is owned and/or operated by the same party that owns and/or operates the access point.

One or more mobile devices 206a, 206b, . . . 206n (collectively referenced as mobile devices 206) establish communication with the access point 208. The mobile devices 206 may include any mobile telecommunications devices, such as laptops, mobile phones, PDAs, media players, and similar devices that are able to connect to the access point, and which have multimedia capabilities, such as video, voice, email, IM, MMS, or any combination thereof. The mobile devices 206 may transmit data, such as multimedia content, to the access point 208 using any short-range wireless transmission protocol such as, for example, WiFi, WiMax, Bluetooth, etc. Some or all of the mobile devices 206 may receive service from the same telecommunications carrier that operates the telecommunications carrier systems 106, or the mobile devices may receive service from a third party telecommunications carrier.

As will be described in additional detail herein, the local IMS server 210 is operable to receive multimedia content from a sending mobile device and to cause the received multimedia content to be transmitted to a receiving mobile device or devices. For example, a sending mobile device such as mobile device 206a may intend to transfer multimedia content to a receiving mobile device 206b. A request is made by mobile device 206a to send multimedia content to the receiving mobile device. The request is routed to the local IMS server 210 which determines whether the receiving mobile device 206b is accessible via the wireless local network 202. If the receiving mobile device is accessible via the wireless local network, the local IMS server establishes the multimedia connection and monitors the transfer of multimedia content between the devices during the session. If the receiving mobile device is not accessible via the wireless local network, the multimedia connection request is re-routed to the core IMS server 212 to be acted upon. Since a portion of multimedia traffic may be routed through the local network 202, the traffic does not consume bandwidth on the telecommunications carrier network and reduces the load on the telecommunications carrier systems. The savings in bandwidth and resources allow the telecommunications carrier to provide multimedia services to a larger number of mobile devices at a reduced cost.

The local IMS server 210 maintains a record of the multimedia content session and on a continuous, scheduled, or unscheduled basis transmits the record of the transferred content to the billing component 220. The billing component 220 uses the record of transferred multimedia content to assess a fee associated with the session. The fee may, for example, be determined based on the quantity of the transferred multimedia content (e.g., measured by the megabyte) or may be based on the length of time of a multimedia connection (e.g., measured by seconds or minutes). The fee may also be assessed based on the identity of content that is exchanged between the devices. The fee may be assessed against the sending device, against the receiving device, or against both the sending device and the receiving device. The fees may be charged on an as-consumed basis, or may be assessed based on a service plan associated with a mobile device. If a sending device or receiving device receives services from a third party telecommunications carrier, the billing component 220 exchanges sufficient information with the third-party carrier to allow the third-party carrier to levy the appropriate charges associated with the communication session.

Figure 3:
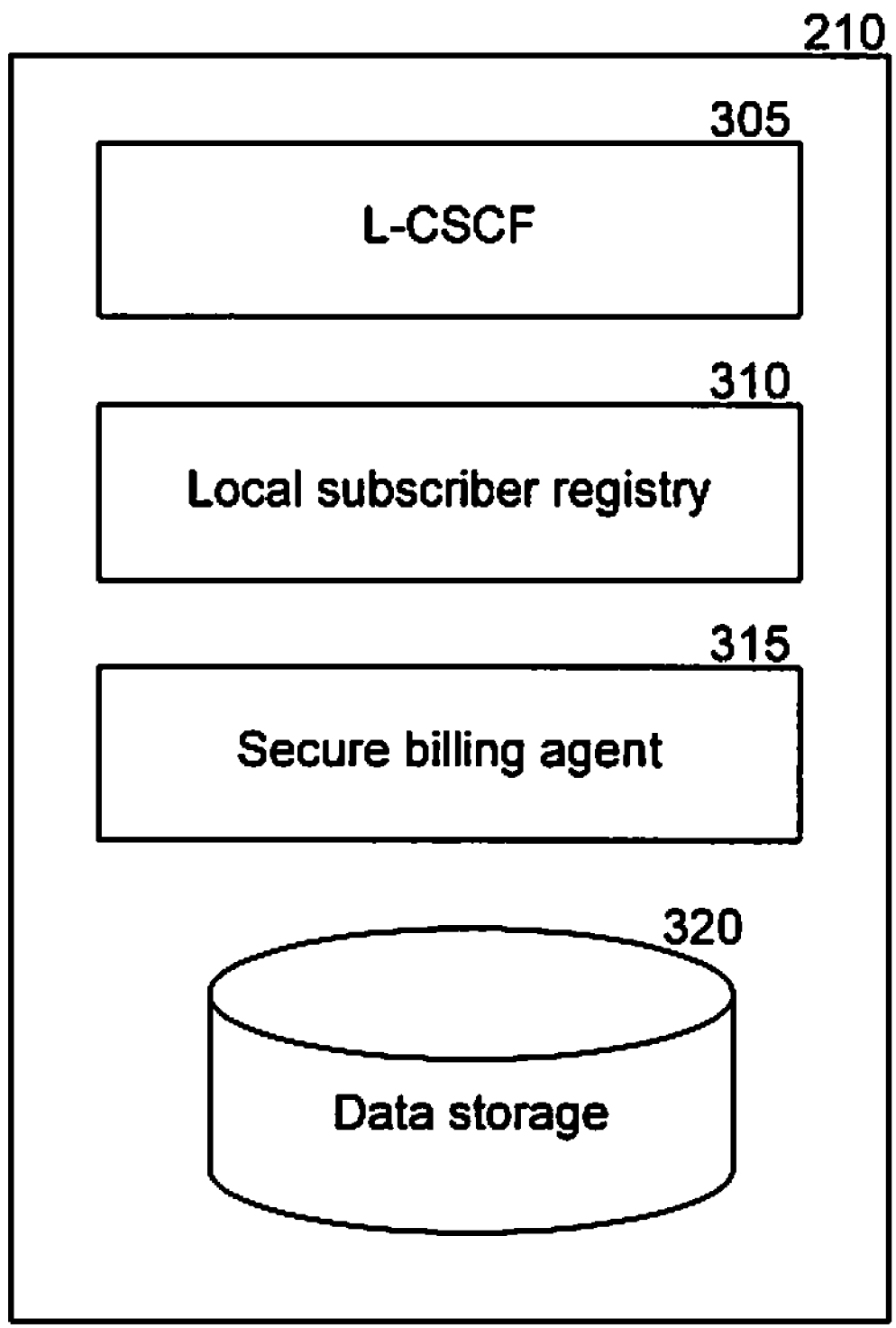
FIG. 3 is a block diagram of a local IMS server that operates to establish multimedia content sharing between mobile devices in a local network, and reconciliation of local multimedia content charges with a billing component.

FIG. 3 is a block diagram of the local IMS server 210 that operates to establish a multimedia session between mobile devices 206 in a local network 202 and reconciliation of multimedia content charges by the billing component 220. The local IMS server 210 comprises a local Call Session Control Function component (L-CSCF) 305, a local subscriber registry 310, a secure billing agent 315, and a data storage area 320. The L-CSCF 305 establishes, monitors, supports, and releases multimedia sessions between mobile devices 206 that communicate via the local network. In response to a transmission request from a sending mobile device, the L-CSCF consults the local subscriber registry 310 to determine whether the intended receiving device is currently accessible via the local network 202. The local subscriber registry 310 may receive information about the registration of other local mobile devices directly from the access point 208 when a registration of a mobile device with the access point occurs. Alternatively or additionally, the local subscriber registry may receive periodic updates from the telecommunications carrier systems, such as from a presence server. The periodic updates reflect mobile devices that are registered with and accessible via the local network. The local subscriber registry 310 identifies those mobile devices that are locally accessible based on, for example, a unique identifier that is associated with a mobile device. The unique identifier may include an IMPU, IMPI, or other legacy identifier (e.g., IMSI, TMSI, IMEI, or MSISDN) of a mobile device. The discovery of other local mobile devices may also be implemented using BEUI (BIOS Extended User Interface) or through the use of intelligent network mapping using call and network data. For example, network data may reveal that multiple users are using shared network components such as a cell tower or a WiFi wireless access point.

If the local subscriber registry 310 indicates that the receiving device is currently accessible via the local network 202, the L-CSCF 305 establishes a local connection between the sending device and the receiving device. If the local subscriber registry indicates that the receiving device is currently not accessible via the local network, the L-CSCF passes the transmission request to the core IMS server 212. The CSCF 216 in the core IMS server 212 may then process the transmission request in order to establish a connection between the sending device and a receiving device that is accessible in a different network other than the local network 202. The local connection process and the core connection process may be governed by requirements specified in 3GPP (3rd Generation Partnership Project) specifications. Such specifications include 3GPP TS 23.228 (IP Multimedia Subsystem (IMS); Stage 2) and other specifications cited therein, which are incorporated herein by this reference in their entirety.

In some embodiments, the local subscriber registry 310 may include whitelists and/or blacklists of allowed or blocked devices. Whitelists are lists of devices that the L-CSCF allows to establish a local multimedia session, while blacklists are lists of devices that the L-CSCF does not allow to establish a local multimedia session. Whitelists of blacklists may be checked by the L-CSCF prior to allowing a connection request to be completed.

Once a local multimedia session is established between a sending device mobile device and a receiving mobile device through the local network 202, the L-CSCF 305 monitors the session and the multimedia content that is transferred between the devices during the session. All communications that are sent from the sending mobile device to a receiving mobile device may be routed through the local IMS server 210. The secure billing agent 315 creates a session record that is associated with each multimedia session and stores the record in the data storage area 320. The record contains a general characterization of the session, including, but not limited to, an identification of the sending device, the receiving device, the starting time of the session, the ending time of the session, and the amount of data transmitted during the session. In addition, the session record may contain a specific characterization of any multimedia content that is transmitted during the session. For example, if a mobile device user has permission to distribute a copyrighted song to a limited number of users, the secure billing agent will record the identity of the copyrighted song if it was transmitted to a receiving device. Alternatively and/or additionally, the record may contain an identification of the creator of the content and any information from a receiving mobile device that indicates an agreement to pay or other otherwise compensate for content (e.g., a payment token or password).

As will be described in additional detail herein, on a continuous, scheduled, or unscheduled basis, the secure billing agent 315 transmits the session records that are maintained in the data storage area 320 to the billing component 220 that is operated by the telecommunications carrier. The session records enable the billing component to charge for the multimedia session and any specific pieces of multimedia content that are transmitted during the session. By enabling mobile users to distribute multimedia via a local network connection, the disclosed technology reduces the cost of distributing multimedia content to mobile device users.

In order to prevent fraud or other inappropriate uses of the system, the secure billing agent 315 encrypts information that is stored in the data storage area 320 and exchanges the information with the billing component 220 in a secure fashion. Examples of encryption technologies that may be applied to the storage and transmission of session records include: SSL, PGP, IPSEC, TLS, etc. Those skilled in the art will appreciate that other forms of encryption may be used to make it difficult or impractical to tamper with the stored session data.

Those skilled in the art will appreciate that the local IMS server 210 and other system components may be implemented on any computing system or device. Suitable computing systems or devices include server computers, multi-processor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Implementing software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Figure 4:
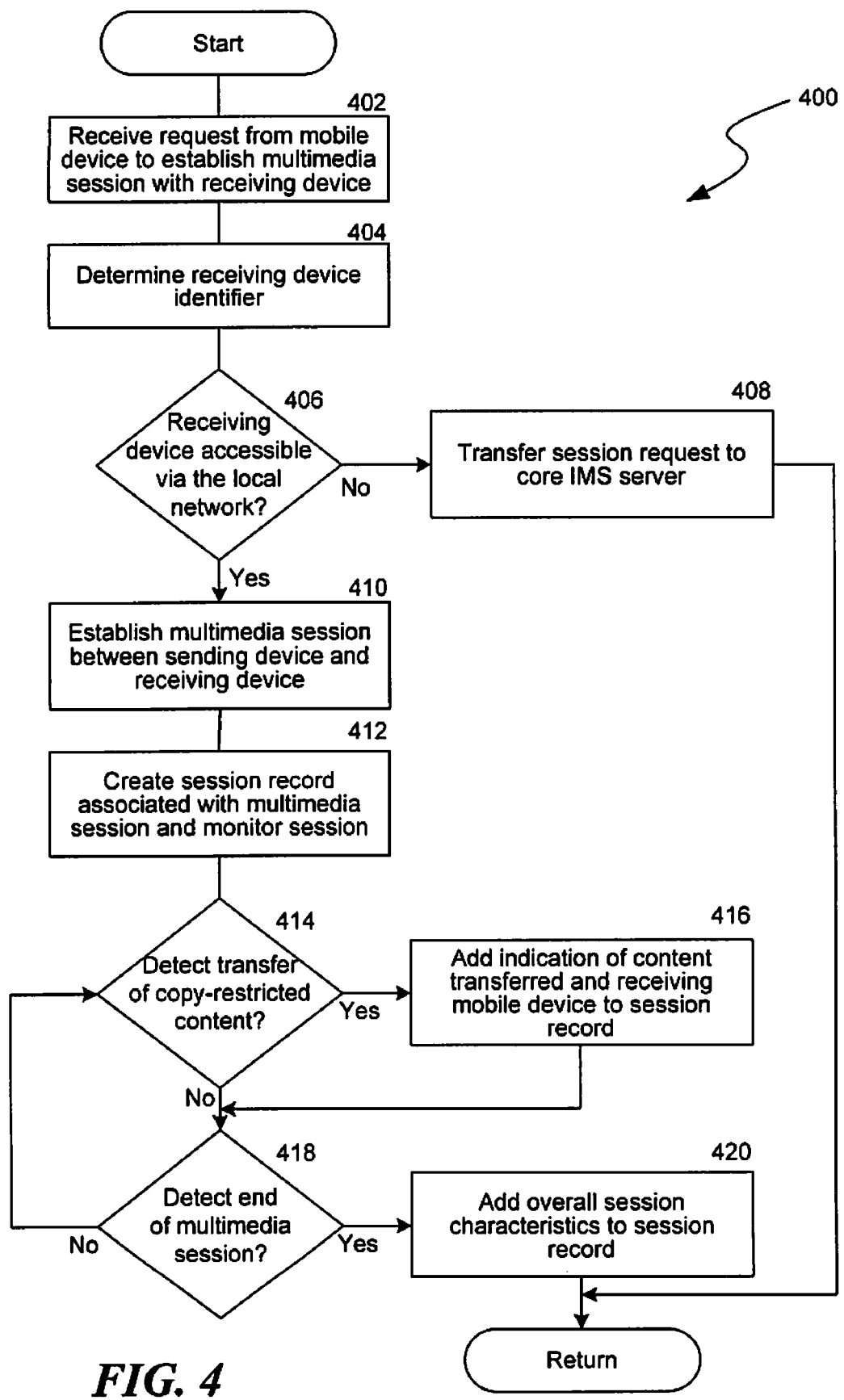
FIG. 4 is a flow chart of a method to establish a session to transfer multimedia content between mobile devices within a local network.

FIG. 4 is a flow chart of a method 400 to establish a session to transfer multimedia content between mobile devices over a local network. At a block 402, the local IMS server 210 receives a request from a sending mobile device to establish a multimedia session with one or more receiving mobile devices. (The request may be initially routed to the local IMS server 210 by the access point 208.) At a block 404, the IMS server 210 determines an identifier associated with each receiving mobile device in the request. The identifier may be derived from the session request (e.g., the identifier may be included in the request) or the identifier may be determined by querying a remote registry to receive an identifier associated with each receiving device. At a decision block 406, the local IMS server determines whether the receiving mobile device or devices are accessible via the local network. To determine whether the mobile devices are accessible, the local IMS server queries the local subscriber registry 310 using the determined identifier. Alternatively, the local IMS server may query a remote registry that is maintained by the telecommunications carrier and which contains current location information of mobile devices in the overall network.

If the local IMS server 210 receives an indication that the receiving device or devices are not accessible via the local network at decision block 406, processing continues to a block 408 where the local IMS server transfers the session request to the core IMS server 212. The core IMS server may then establish a multimedia session using the previously described techniques that are known in the art. If, however, at decision block 406 the local IMS server receives an indication that the receiving device or devices are accessible via the local network, processing continues to a block 410.

At block 410, the local IMS server 210 establishes a multimedia session between the sending device and the local receiving device or devices. The multimedia session may be established and governed in accordance with the 3GPP IMS specifications, as is known in the art. At block 412, the local IMS server 210 creates and stores a secure session record that is associated with the multimedia session. The secure session record maintains sufficient details of the multimedia session to allow the telecommunications carrier to account for and charge for all or portions of the local session. At block 412, the local IMS server also begins to monitor characteristics of the session and multimedia content that is exchanged between the mobile devices. The sending device and the receiving device or devices may proceed to exchange multimedia content as part of the managed session.

At a decision block 414, the local IMS server 210 detects the transfer of copy-restricted content via the multimedia session. The local IMS server 210 detects the transfer of copy-restricted content by detecting unique identifiers associated with the content in the multimedia stream. "Copy-restricted content" is any content that has one or more limitations on the transfer of that content. One type of content that has limitations on transfer is content that may only be transferred to a receiving device if the receiving device user agrees to pay for the content. For example, a mobile device user may purchase and download a song in order to listen to the song on the user's mobile device. It may be beneficial to allow the user to distribute the song to his or her friends in order to help market the song. The copyright holder of the song would normally only agree to do so under conditions where the friends that receive the song are also obligated to pay for the song. The local IMS server is therefore configured to detect the transfer of the song to a receiving device, and, as will be described in additional detail, maintain a record of the transfer so that the receiving device user is ultimately billed for the transfer from the sending device. Another type of content that has limitations on transfer is content that may only be transferred from a sending mobile device user to other mobile device users if the other users agree to provide certain identifying information (e.g., an email address, an IM address, demographic information) for marketing purposes. For example, a mobile user may be allowed to distribute a viral marketing video if the recipients of the video provide certain identifying information in return. The local IMS server is therefore configured to detect the transfer of the video to a receiving device and maintain a record of the transfer in a manner that allows the recipient user to satisfy the obligations associated with the transfer.

If the local IMS server 210 detects the transfer of copy-restricted content at decision block 414, processing continues to block 416 where the local IMS server 210 adds an indication of the content that was transferred and the recipient of the content to the session record. The information that is stored in the session record may depend, in part, on the amount of information that is necessary to allow a telecommunications carrier to subsequently reconcile the transfer. The session record may be as simple as a time stamp, an identifier of the sending mobile device, an identifier of the transferred multimedia content, and an identifier of the receiving mobile device. Additional data characterizing the transfer, such as the length of the transfer, whether any errors occurred during the transfer, etc. may also be added by the local IMS server to the session record. After adding an indication of the transferred multimedia content to the session record, processing continues at decision block 418.

At decision block 418, the local IMS server 210 determines whether the multimedia session has been terminated. A session may be expressly terminated by the sending or the receiving mobile devices, or the session may be terminated by leaving a coverage area, device error, or communication link error. If the multimedia session is continuing, processing continues at decision block 414 where the local IMS server continues to monitor for the transmittal of copy-restricted content. If, however, the multimedia session has been terminated, processing continues to a block 420. At block 420, the local IMS server adds additional data to the session record that characterizes the overall multimedia session. Such data may include, for example, the aggregate amount of data transmitted during the session or the length of time of the session.

The method 400 is repeated for each multimedia session that is managed by the local IMS server 210. Those skilled in the art will appreciate that although the method contemplates the initial session request being made to the local IMS server 210, the initial session request may instead be made to the core IMS server 212. In such a situation, the core IMS server 212 would determine whether the multimedia session may be managed by the local IMS server, and if the session may be locally managed, would transfer the session request to the local IMS server. Regardless of whether the initial request is made to the local or to the core IMS server, the management and recordation of details of the multimedia session across the local network is performed locally.

Figure 5:
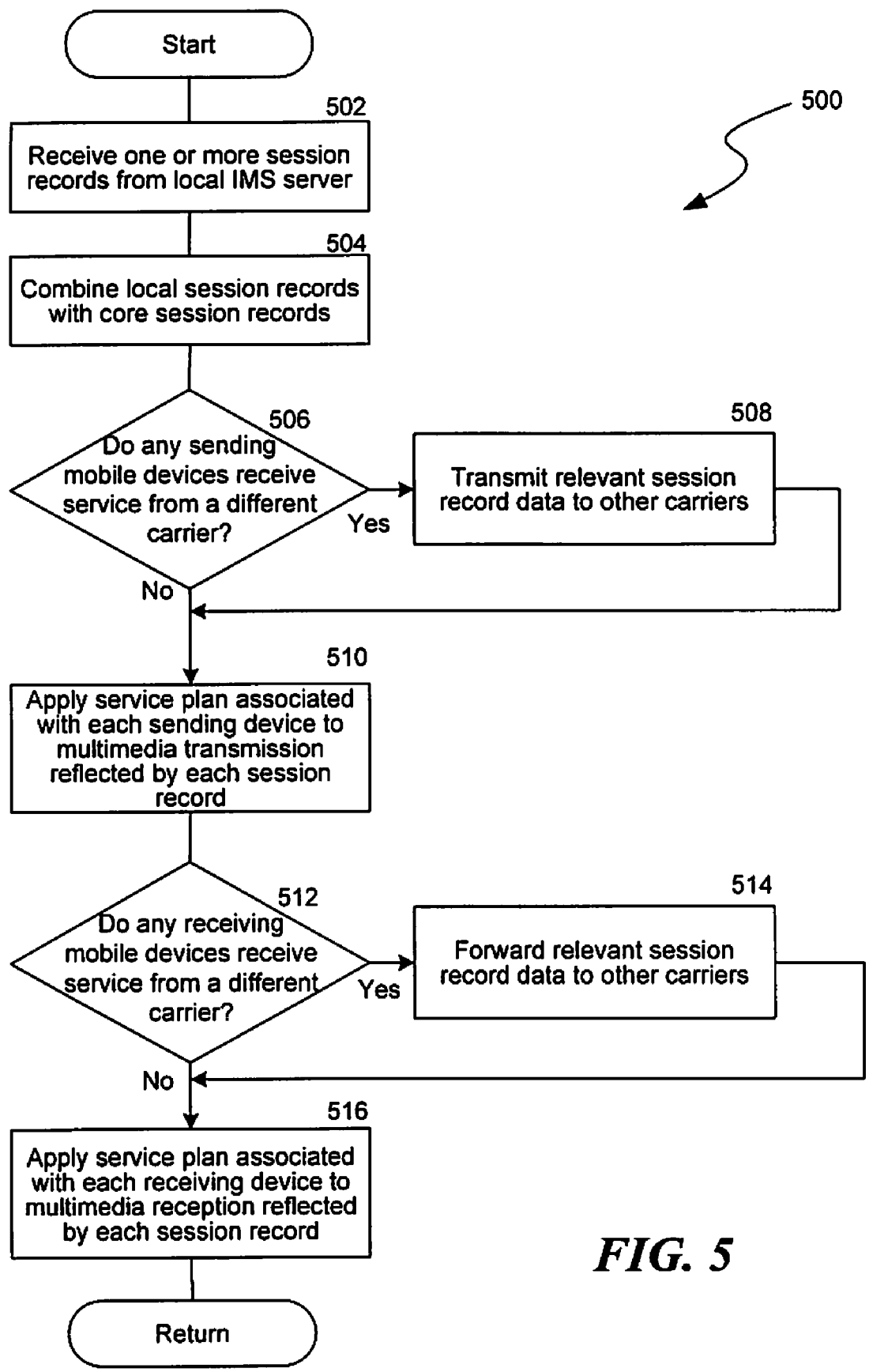
FIG. 5 is a flow chart of a method to reconcile records of multimedia content that has been distributed within a local network.

On a continuous, scheduled, or unscheduled basis, the session records associated with the one or more multimedia sessions are transmitted to the billing component 220 of the telecommunications carrier where they are used to assess charges to sending and/or receiving mobile devices. FIG. 5 is a flow chart of a method 500 to reconcile session records evidencing the distribution of multimedia content across a local network. At a block 502, the billing component 220 receives one or more session records from a local IMS server. The billing component may request that the session records be transmitted from the local IMS server 210 (i.e., using a pull method) or the billing component may receive the session records from a local IMS server without making a request (i.e., via a push method from the local IMS server). The billing component typically receives session records from a number of different local IMS servers, since each local IMS server is responsible for managing and recording the characteristics of multimedia sessions across a corresponding local network. If the session records are encrypted by the corresponding local IMS server, the billing component applies an appropriate decryption technique to recover the underlying data that characterizes the multimedia session.

At a block 504, the billing component 220 combines the session records that were received from local IMS servers 210 with session records that were generated by the core IMS server 212. By combining the local and core session records, the billing component may accurately establish charges for a particular time period because the billing component has a record of all multimedia sessions that occurred during that time frame. For example, the billing component may compile all records of sessions that are completed within the past calendar month. To facilitate processing, the billing component may first perform multiple sorts on the session records to group session records by sending mobile device and to group session records by receiving mobile device.

At a decision block 506, the billing component 220 determines whether any of the sending mobile devices receive service from a telecommunications carrier other than the telecommunications carrier that is associated with the billing component. If some of the sending devices receive service from other telecommunications carriers, at a block 508 the billing component transmits relevant data from the session records to the other telecommunications carriers. The session record data may be transmitted in raw form, without editing or removal of data. Alternatively, the session record data may be transmitted in aggregate form or in a limited form that discloses the minimum required for the receiving telecommunications carriers to establish charges for the corresponding multimedia sessions.

At a block 510, the billing component 220 applies the service plan associated with each sending device to determine the charges that should be levied against each sending device for the associated time period. The charges that are levied may be based on the number and/or length of the multimedia session, and may also be based on the identity of any copy-restricted content that is transmitted during the multimedia session. For example, the mobile device user may be charged one fee for a certain amount of data transfer during the multimedia sessions (e.g., 5 megabytes), and a second fee for the transmission of certain pieces of content during the multimedia sessions (e.g., the transfer of two songs and a video). In some embodiments, the billing component 220 may apply a discount for local multimedia sessions as opposed to multimedia sessions that are managed by the core. For example, the billing component may discount local multimedia sessions by 50% since the system resources needed to manage local multimedia sessions are less than the system resources needed to manage multimedia sessions through the core. Typically, such discounts are only applied against the number and/or length component of the session fee as opposed to the portion of the fee that is associated with the transfer of certain pieces of content. In some circumstances, rather than charge a fee for the transfer of certain pieces of content, the billing component may provide a credit to the sending mobile device for each piece of copy-restricted content that is transferred. The billing component may provide a credit since the telecommunications carrier or the copyright holder may want to encourage mobile device users to act as agents to facilitate the dissemination of paid media. For example, a mobile device user may receive a $0.05 credit for each media song that it transfers to another mobile device user that the other mobile device user agrees to purchase.

At a decision block 512, the billing component 220 determines whether any of the receiving mobile devices receive service from a telecommunications carrier other than the telecommunications carrier that is associated with the billing component. If some of the receiving devices receive service from other telecommunications carriers, at a block 514 the billing component transmits relevant data from the session records to the other telecommunications carriers. The session record data may be transmitted in raw form, without editing or removal of data. Alternatively, the session record data may be transmitted in aggregate form or in a limited form that discloses the minimum required for the receiving telecommunications carriers to establish charges for the corresponding multimedia sessions.

At a block 516, the billing component 220 applies the service plan associated with each receiving device to determine the charges that should be levied against each receiving device for the associated time period. The charges that are levied may be based on the number and/or length of the multimedia session, and may also be based on the identity of any copy-restricted content that is transmitted during the multimedia session. For example, the mobile device user may be charged one fee for a certain amount of data transferred during the multimedia sessions (e.g., 5 megabytes), and a second fee for the receipt of certain pieces of content during the multimedia sessions (e.g., the receipt of two songs and a video). In some embodiments, the billing component may apply a discount for local multimedia sessions as opposed to multimedia sessions that are managed by the core. For example, the billing component may discount local multimedia sessions by 50% since the system resources needed to manage local multimedia sessions is less than the system resources needed to manage multimedia sessions through the core. Typically, such discounts are only applied against the number and/or length component of the session fee as opposed to the portion of the fee that is associated with the receipt of certain pieces of content. In some embodiments, the receiving device user may receive a discount on the purchase of copy-restricted content over the local network, since the telecommunications carrier or the copyright holder may want to encourage the local acquisition of such content.

From the foregoing, it will be appreciated that specific embodiments of the invention have been described herein for purposes of illustration, but that various modifications may be made without deviating from the spirit and scope of the invention. For example, other methods and protocols for implementing registration of the mobile devices with the local IMS server may be used.

While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Accordingly, the invention is not limited except as by the appended claims.

We claim:

1. A system for establishing sessions to share multimedia content between two or more mobile devices across a wireless local network and record shared multimedia content for charging purposes, the system comprising:
    a local Call Session Control Function (CSCF) component associated with a telecommunications carrier and coupled to a single wireless access point, the local CSCF component configured to:
        receive a request from a sending mobile device via the single wireless access point to establish a multimedia communication session with one or more receiving mobile devices;
        determine whether the one or more receiving mobile devices are communicatively coupled to the single wireless access point;
        establish a multimedia communication session between the sending mobile device and one or more receiving mobile devices that are coupled to the single wireless access point such that multimedia transmitted during the multimedia communication session is substantially transmitted via the wireless local network generated by the single wireless access point; and
        monitor a characteristic of the multimedia communication session; and
    a secure billing agent coupled to the local CSCF component and configured to:
        store the monitored characteristic of the multimedia communication session in a session record; and
        transmit the session record to the telecommunications carrier to enable charges to be levied for the multimedia communication session that occurred over the wireless local network.

2. The system of claim 1, wherein the monitored characteristic of the multimedia communication session is a length of the session.

3. The system of claim 1, wherein the monitored characteristic of the multimedia communication session is an amount of data transmitted during the session.

4. The system of claim 1, wherein the monitored characteristic of the multimedia communication session is an identity of one or more pieces of multimedia content transmitted during the session.

5. The system of claim 1, wherein the local CSCF component determines whether the one or more receiving mobile devices are communicatively coupled to the single wireless access point by querying a registry that contains a list of mobile devices accessible for communication via the single wireless access point.

6. The system of claim 5, wherein the registry is located remotely from the local CSCF component.

7. The system of claim 1, wherein the secure billing agent is further configured to encrypt the session record.

8. The system of claim 1, wherein the charges are levied by the telecommunications carrier against the sending mobile device.

9. The system of claim 1, wherein the charges are levied by the telecommunications carrier against the receiving mobile device.

10. The system of claim 1, wherein the charges levied by the telecommunications carrier reflect a discount over charges that would be levied by the telecommunications carrier for a multimedia communication session that does not occur over the wireless local network.

11. The system of claim 1, wherein the secure billing agent automatically transmits the session record to the telecommunications carrier.

12. The system of claim 1, wherein the secure billing agent transmits the session record to the telecommunications carrier in response to receiving a query from the telecommunications carrier.

13. A method for establishing sessions to share multimedia content between two or more mobile devices across a wireless local network and record shared multimedia content for charging purposes, the method comprising:
    receiving a request from a sending mobile device via a single wireless access point to establish a multimedia communication session with one or more receiving mobile devices;
    determining whether the one or more receiving mobile devices are communicatively coupled to the single wireless access point;
    establishing a multimedia communication session between the sending mobile device and one or more receiving mobile devices that are coupled to the single wireless access point such that multimedia transmitted during the multimedia communication session is substantially transmitted via the wireless local network generated by the single wireless access point;
    monitoring a characteristic of the multimedia communication session;
    storing the monitored characteristic of the multimedia communication session in a session record; and
    transmitting the session record to a telecommunications carrier to enable charges to be levied by the telecommunications carrier for the multimedia communication session that occurred over the wireless local network.

14. The method of claim 13, wherein the monitored characteristic of the multimedia communication session is a length of the session.

15. The method of claim 13, wherein the monitored characteristic of the multimedia communication session is an amount of data transmitted during the session.

16. The method of claim 13, wherein the monitored characteristic of the multimedia communication session is an identity of one or more pieces of multimedia content transmitted during the session.

17. The method of claim 13, wherein determining whether the one or more receiving mobile devices are communicatively coupled to the single wireless access point comprises querying a registry that contains a list of mobile devices accessible for communication via the single wireless access point.

18. The method of claim 17, wherein the registry is located remotely from the access point.

19. The method of claim 13, further comprising encrypting the session record.

20. The method of claim 13, wherein the charges are levied by the telecommunications carrier against the sending mobile device.

21. The method of claim 13, wherein the charges are levied by the telecommunications carrier against the receiving mobile device.

22. The method of claim 13, wherein the charges reflect a discount over charges for a multimedia communication session that does not occur over the wireless local network.

23. The method of claim 13, wherein the session records are automatically transmitted to the telecommunications carrier.

24. The method of claim 13, wherein the session records are transmitted to the telecommunications carrier in response to receiving a query from the telecommunications carrier.

25. A method of charging for multimedia communication sessions that were conducted between two or more mobile devices across a wireless local network, the method comprising:
  transmitting a request to receive local session records associated with a wireless local network;
  receiving one or more local session records following the request, each of the local session records reflecting a monitored characteristic of a multimedia communication session between a sending mobile device and a receiving mobile device across a wireless local network;
  receiving one or more core session records, each of the core session records reflecting a monitored characteristic of a multimedia communication session between a sending mobile device and a receiving mobile device across a core network;
  applying a first service plan to the one or more core session records to determine charges that should be levied on the sending mobile device and the receiving mobile device associated with each core session record based on the monitored characteristic; and
  applying a second service plan to the one or more local session records to determine charges that should be levied on the sending mobile device and the receiving mobile device associated with each local session record based on the monitored characteristic, wherein the charges applied by the second service plan are less than the charges applied by the first service plan for a multimedia communication session having comparable monitored characteristics.

26. The method of claim 25, wherein the monitored characteristic is a length of the multimedia communication session, an amount of data transmitted during the multimedia communication session, or an identity of one or more pieces of multimedia content transmitted during the multimedia communication session.

27. The method of claim 25, further comprising decrypting the one or more local session records.

28. The method of claim 25, wherein the charges are only levied on receiving mobile devices.

29. The method of claim 25, wherein the charges are only levied on sending mobile devices.

30. The method of claim 25, wherein the local session records are automatically received.

31. The method of claim 25, wherein the request is transmitted to a local IMS server.

* * * * *